United States Patent Office 3,785,993
Patented Jan. 15, 1974

3,785,993
STABLE LIQUID EMULSIFIER COMPOSITIONS
Roy Kenneth Langhans, Newark, Del., assignor to
ICI America Inc., Wilmington, Del.
No Drawing. Filed June 4, 1971, Ser. No. 150,195
Int. Cl. B01f *17/34*
U.S. Cl. 252—356                        10 Claims

ABSTRACT OF THE DISCLOSURE

Temperature-stable, clear liquid emulsifier baking compositions comprising an ethoxylated fatty acid ester of a glycerol, hexitol, a hexitan, or an isohexide as a conditioner and a monoglyceride as a softener in combination with small amounts of clarifiers selected from propylene glycol, water, ethanol, and edible oils have been found more suitable for the continuous manufacture of baked goods. The liquid emulsifier compositions may be metered into the shortening or directly into the dough or sponge for batch methods of preparation or into the liquid brew or sponge in continuous processes.

---

This invention relates to clear liquid emulsifier compositions and to yeast-raised baked products prepared with liquid emulsifier compositions. More particularly, this invention relates to stable, clear liquid emulsifier compositions which contain a glycerol partial ester as a softener, a polyoxyethylene ester of a glycerol, hexitol, hexitan, or isohexide as a conditioner, and small quantities of clarifying and stabilizing agents consisting of propylene glycol, water, ethanol, and edible oils. These compositions when incorporated into a yeast-raised baked product condition the dough prior to baking and inhibit the staling of the fininshed baked product. This invention further relates to methods of preparing said yeast-raised baked products including processes of continuous breadmaking.

The "staling" of bread and similar yeast-leavened products is commonly believed to comprise chemical as well as physical changes which occur in the finished product upon storage under normal storage conditions. The factors contributing to such chemical and physical change in the finished product are known to be complex and varied; even yet, not all the contributing factors are completely understood. Whatever may be causing the staling of yeast-raised baked goods upon storage, it is known that the incorporation of certain emulsifiers into the dough prior to baking will cause a retention in softness of the finished product; i.e., will retard staling. Moreover, such agents frequently improve dough condition which facilitates the handling of the dough during the baking process. A number of antistaling agents exist and are normally used in the production of yeast-raised baked goods; among these the monoglycerides, or more commonly, a mixture of mono- and diglycerides are preferred. In addition to these, antistaling and dough conditioning agents are desired which may be used at reduced levels or concentrations in the preparation of the baked product to produce a comparable or superior result in the finished product which are adaptable to both the batch and continuous breadmaking processes and which would be either an easily flowable solid or preferably a liquid product with the above properties.

It is, accordingly, an object of the present invention to provide a stable, clear liquid emulsifying composition for use in preparing baked goods having antistaling characteristics equivalent to those produced with non-liquid emulsifier compositions.

It is another object of the present invention to provide emulsifier compositions suitable for use in the continuous production of bread and other baked products which condition the doughs formed therein to improve their workability in the process, which effectively retards the staling of the final baked products, and which are easy to use during the baking process because of their fluidity.

It is another object to provide clear liquid emulsifier compositions which are stable and clear at temperature of 70° F. and above.

It is another object of the present invention to provide emulsifier compositions which may be used in either batch or continuous breadmaking processes and have the effect of improving the texture of the final baked products.

It is another object to provide an improved process for making bread products.

All of the foregoing objects and still further objects of the present invention may be accomplished by employing novel liquid emulsifier compositions of the present invention.

The compositions which are contemplated by this invention are combinations of highly unsaturated monoglyceride softeners and polyoxyethylenated derivatives of fatty acid esters of glycerol, hexitan, hexitol, or isohexide, or fatty acid esters of polyoxyethylenated glycerol, hexitan, hexitol, or isohexide conditions which are stabilized and clarified by the addition of measured amounts of propylene glycol, water, ethanol, and edible oils. These products are different from similar combinations in that they are clear liquids and stable at temperatures above 70° F. Such combinations can be taken to as low as 33° F. and cycled several tims from high to low temperatures without separation, gelation, or the formation of precipitates at 70° F.

The weight percent of each component, respectively, within the range of the invention will be as follows: the monoglyceride softener and the polyoxyethylene-containing conditioner are from 60 to 99.3% by weight, with the condition that the monoglyceride is about 10 to 80% of the two-component combination, the clarifiers are usually much less than half the total composition, but with the limits of 3 to 40% when propylene glycol, 0.7 to 40% when ethanol (5% aqueous), 5 to 21% when water, and 3 to 25% when edible oils are employed selectively.

The term "monoglyceride" when used in this invention relates to both a pure monoester of glycerine and a mixture of monoesters and diesters of glycerine. The monoglycerides of this invention are at least 86% unsaturates, that is at least 86 mol percent of the fatty acid molecular segment of the monoglyceride comprises unsaturated fatty acids. In a preferred embodiment of this invention the degree of unsaturation is at least about 88%. Fatty acid monoglycerides which are 100% unsaturated can be employed as well. Unsaturated fatty acid esters which may be employed include the glycerol esters of oleic acid, linoleic acid, vaccenic acid, licanic acid, and cetoleic acid as well as other unsaturated fatty acid esters which contain from about 12 to about 22 carbon atoms. Any saturated fatty acid ester containing from 8 to about 24 carbon atoms may be used in conjunction with the unsaturated fatty acid esters to achieve the desired minimum level of unsaturated fatty acid esters. In general, they will contain at least about 40% and preferably 50–56% by weight alpha-mono content in the monoglycerol ester.

The monoglycerides which may be used in accordance with this invention may be prepared by transesterification, glycerolysis, or direct esterification of glycerine. Transesterification is generally accomplished by mixing sufficient glycerine with a triglyceride so that during the reaction the mols of glycerine to fatty acid are adjusted to achieve the desired amount of monoglyceride with residual triglycerides and diglycerides.

The conditioner which is a constituent of the clear liquid emulsifier blend of the instant application is a hydrophilic emulsifier which is comprised of a class of ethoxylated fatty acid esters of glycerol, hexitol, hexitan, and isohexide, as well as fatty acid esters of ethoxylated hexitan, hexitol, glycerol, and isohexide. More specifically, the class includes the ethoxylated fatty acid monoesters, diesters, and triesters of sorbitol, mannitol, dulcitol, and iditol; and the monoesters, and diesters of their corresponding mono- and dianhydrides. A preferred class are those wherein the hexitol is sorbitol or the anhydride sorbitan and isosorbide.

The fatty acids which may be used to prepare ethoxylated esters of glycerol, hexitol, hexitan, and isohexide or the esters of ethoxylated hexitol, hexitan, and isohexide are in general those having from about 12 to 22 carbon atoms and comprise such fatty acids as stearic, palmitic, lauric, oleic, behenic, arachidic, and myristic. Saturated fatty acids are preferred. The ethoxylated fatty acid esters of glycerol, hexitol, hexitan, or isohexide or a fatty acid ester of ethoxylated hexitol, hexitan, or isohexide may be prepared in numerous ways such as esterification of sorbitol or glycerine followed by ethoxylation of the resultant ester, or transesterification of sorbitol and ethoxylation of the resultant ester, ethoxylation of sorbitol, sorbitan, or isosorbide and esterification of the product. The following is an example of the preparation of a higher fatty acid partial ester of sorbitol:

EXAMPLE A

One mol of sorbitol pellets and 900 ml. of dimethylformamide were placed in a three-necked flask, equipped with thermometer, mechanical stirrer (10 inch) Vigreux column and condenser. The mixture is heated with stirring until the sorbitol is completely dissolved (approximately 34° C.).

12 grams of anhydrous $K_2CO_3$ is dissolved in 50 to 75 millimeters of methanol in a steam bath and the solution added to the reaction mixture. Methanol is then removed by distillation. (The catalyst may be added as a solid as well as a methanol solution.) After removal of the methanol, two moles of methyl stearate are added and the reaction mixture reacted at 90° C. When approximately 35% methyl stearate is reacted, the temperature can be raised up to 130 to 135° C. The temperature, however, should not exceed 135° C. to avoid anhydrizing the sorbitol. The reaction time for the different preparations vary from 10 to 12 hours up to several days. Periodically vacuum is applied to remove methanol liberated during the reaction.

The progress of the reaction was followed by taking samples periodically and analyzing for the unreacted methyl stearate by gas liquid chromatography (GLC). When the unreacted methyl stearate was below 5%, the solvent was removed under high vacuum, being careful not to exceed 135° C. pot temperature. The analysis of the product is as follows: saponification number 136, hydroxyl number 306, acid number 3.4.

One ml. sample was taken from the reaction mixture and placed in a 25 ml. Erlenmeyer flask, which contained 15 ml. of 10 to 15% sodium chloride solution. The methyl stearate is then extracted with 5 ml. ether and was analyzed for GLC with a four-foot, 25% diethylene glycol succinate column at 200° C.

In the polyoxyethylene-containing emulsifiers used in the emulsifier blend of this invention, the mol ratio of ethylene oxide to glycerol, hexitan, or isohexide may vary from as low as about 4 to 1 to as high as about 40 to 1, and are designated polyoxyethylene(4–40) sorbitol, sorbitan, or isosorbide, with a 10:1 to 20:1 mol ratio being preferred.

Representative of the polyoxyethylene-containing fatty acid esters are polyoxyethylene sorbitol distearate, polyoxyethylene sorbitan monostearate, polyoxyethylene isosorbide dipalmitate, polyoxyethylene sorbitan distearate, polyoxyethylene isosorbide monooleate, polyoxyethylene sorbitol trilaurate, polyoxyethylene sorbitan dibehenate, polyoxyethylene isosorbide monolinoleate, polyoxyethylene sorbitan monolaurate, polyoxyethylene mannitan monooleate, polyoxyethylene sorbitan monopalmitate, polyoxyethylene sorbitol oleate, polyoxyethylene iditan monostearate, as well as other similar ethoxylated fatty acid esters of hexitols, hexitans, and isohexides or the fatty acid esters of ethoxylated hexitols, hexitans, and isohexides. Others are polyoxyethylene derivatives of fatty acid mono- and diesters of glycerine such as glycerol monostearate, glycerol distearate, glycerol monopalmitate, glycerol dipalmitate, glycerol monooleate, glycerol dioleate, and glycerol esters similar to those mentioned for hexitols.

The clear liquid emulsifier composition of this invention may be prepared by mixing with suitable agitation and heat, a monoglyceride of the kind hereinbefore described, a polyoxyethylene derivative of glycerol, sorbitol, sorbitan, or isosorbide fatty acid ester, or a fatty acid ester of a polyoxyethylene derivative of a sorbitol, sorbitan, or isosorbide mentioned above, and clarifiers selected from the group consisting of propylene glycol, ethanol, water, and edible oils. The resulting compositions are usually always clear liquids which can be cycled to 33° F. and back to room temperature for several times without forming stable precipitates, gels, or separating into two phases.

When propylene glycol is selected as the clarifier, a preferred emulsifier composition arises if it is employed at levels of 10 to 18 weight percent and the distribution of the emulsifier in the remaining 82 to 90% of the composition as percent by weight of the remaining portion is from 35 to 45% of the polyoxyethylene-containing conditioner and from 55 to 65% of the monoglyceride softener. If ethanol is employed, .7–40% can be effective in any conditioner/softener ratio but is especially useful when a conditioner/softener blend of 60/40 is employed and particularly when glycerol monooleate and polyoxyethylene(20)sorbitan monostearate are combined. Preferred compositions contain 9 to 17 weight percent water with 13% being optimum for mixtures containing 53.5 weight percent glycerol monooleate and 33.5% polyoxyethylene(20)sorbitan monostearate. Liquid vegetable oils such as cottonseed, safflower, corn, soybean, coconut, peanut, and hydrogenated oils which are liquids at temperatures above 35° F. are particularly useful. The minimum amount of oil needed to clarify any combination of monoglyceride and conditioner is preferred, since at higher oil levels certain compositions tend to be unstable and separate into two phases. Therefore, compositions having a total oil concentration of 3 to 10% are particularly preferred.

In order for those skilled in the art to better understand the instant invention, the following non-limiting examples of the emulsifier compositions of this invention are given:

Example 1

Emulsifier: Wt. percent blend
Glycerol ester acids of saponified tallow (54 weight percent alpha monoester-89% unsaturated) _____ 53.4
Propylene glycol _____ 6.6
Polyoxyethylene(20)sorbitan monostearate ___ 40

Example 2

Emulsifier: Wt. percent blend
Glycerol ester acids of saponified tallow (54 weight percent alpha monoester-89% unsaturated) _____ 48
Propylene glycol _____ 20
Polyoxyethylene(20)sorbitan monostearate ___ 32

Example 3

Emulsifier: Wt. percent blend
Glycerol ester of acids of saponified tallow (54 weight percent alpha monoester-89% unsaturated) _____ 51
Propylene glycol _____ 15
Polyoxyethylene(20)sorbitan monostearate __ 34

Example 4

| Emulsifier: | Wt. percent blend |
|---|---|
| Glycerol ester of saponified tallow acids (54 weight percent alpha monoester-89% unsaturated) | 66 |
| Propylene glycol | 4 |
| Polyoxyethylene(20)sorbitan monostearate | 30 |

Example 5

| Emulsifier: | Wt. percent blend |
|---|---|
| Glycerol ester acids of saponified tallow (54 weight percent alpha monoester-89% unsaturated) | 44 |
| Propylene glycol | 6 |
| Polyoxyethylene(20)sorbitan monostearate | 50 |

Example 6

| Emulsifier: | Wt. percent blend |
|---|---|
| Glycerol ester of a 75/25 mixture of cottonseed and soybean oil, respectively (55% alpha monoester) | 26 |
| Propylene glycol | 36 |
| Polyoxyethylene(12)isosorbide monobehenate | 38 |

Example 7

| Emulsifier: | Wt. percent blend |
|---|---|
| Glycerol ester of corn oil acids (60% monoester) | 35 |
| Propylene glycol | 15 |
| Polyoxyethylene(20)sorbitan tristearate | 50 |

Example 8

| Emulsifier: | Wt. percent blend |
|---|---|
| Glycerol ester of linseed oil acids (70% monoester) | 15 |
| Propylene glycol | 20 |
| Polyoxyethylene(18)sorbitan dioleate | 65 |

Example 9

| Emulsifier: | Wt. percent blend |
|---|---|
| Glycerol monooleate | 53.5 |
| Water* | 13 |
| Polyoxyethylene(20)sorbitan monostearate | 33.5 |

*Includes water incorporated with other ingredients.

Example 10

| Emulsifier: | Wt. percent blend |
|---|---|
| Glycerol ester acids of saponified tallow (54 weight percent alpha monoester-89% unsaturated) | 65.5 |
| Water* | 7 |
| Polyoxyethylene(20)sorbitan monostearate | 27.5 |

*Includes water incorporated with other ingredients.

Example 11

| Emulsifier: | Wt. percent blend |
|---|---|
| Glycerol ester acids of saponified tallow (54 weight percent alpha monoester-89% unsaturated) | 43.5 |
| Water* | 5 |
| Polyoxyethylene(20)sorbitan monostearate | 51.5 |

Example 12

| Emulsifier: | Wt. percent blend |
|---|---|
| Glycerol monooleate | 66 |
| Cottonseed oil | 3 |
| Polyoxyethylene(20)sorbitan monostearate | 31 |

Example 13

| Emulsifier: | Wt. percent blend |
|---|---|
| Glycerol monooleate | 57 |
| Cottonseed oil | 3 |
| Polyoxyethylene(20)sorbitan monostearate | 40 |

Example 14

| Emulsifier: | Wt. percent blend |
|---|---|
| Glycerol monooleate | 54 |
| Cottonseed oil | 6 |
| Polyoxyethylene(20)sorbitan monostearate | 40 |

Example 15

| Emulsifier: | Wt. percent blend |
|---|---|
| Glycerol monooleate | 51 |
| Cottonseed oil | 9 |
| Polyoxyethylene(20)sorbitan monostearate | 40 |

Example 16

| Emulsifier: | Wt. percent blend |
|---|---|
| Glycerol monooleate | 48 |
| Cottonseed oil | 12 |
| Polyoxyethylene(20)sorbitan monostearate | 40 |

Example 17

| Emulsifier: | Wt. percent blend |
|---|---|
| Glycerol monooleate | 45 |
| Cottonseed oil | 15 |
| Polyoxyethylene(20)sorbitan monostearate | 40 |

Example 18

| Emulsifier: | Wt. percent blend |
|---|---|
| Glycerol monooleate | 42 |
| Cottonseed oil | 18 |
| Polyoxyethylene(20)sorbitan monostearate | 40 |

Example 19

| Emulsifier: | Wt. percent blend |
|---|---|
| Glycerol ester acids of saponified tallow (54 weight percent alpha monoester-89% unsaturated) | 51 |
| Soybean oil | 5 |
| Polyoxyethylene(20)sorbitan monostearate | 44 |

Example 20

| Emulsifier: | Wt. percent blend |
|---|---|
| Glycerol monooleate | 59.3 |
| Ethanol (5% aqueous) | 0.7 |
| Polyoxyethylene(20)sorbitan monostearate | 40 |

As hereinbefore stated, the clear liquid emulsifier composition of this invention is easily incorporated into dough or when desired into shortening. It may be used in either the batch or continuous breadmaking process and the blend may be dispersed in the dough, in the liquid brew or liquid sponge or in the shortening which is generally added to the brew concurrently with the flour in the continuous doughmaking process to form the premix dough. Because of the liquid nature of the emulsifier composition of this invention, the metering of the emulsifier into a continuous process or a batch process is more easily facilitated and standard chemical processing equipment may be used in determining the amount of emulsifier added to any particular batch or to be blended with the brew or liquid sponge in a continuous process. Also, since no water need be added to get a fluid emulsifier system when used in a continuous process, better control of the total water added to the bread can be obtained.

The yeast-raised baked products which are contemplated for preparation in accordance with this invention and are embraced within its purview comprise bread and bread-like products which normally contain not more than about 5% by weight of shortening and not more than about 8% by weight of residual unfermented sugar. In preparing bread or yeast-raised baked products in accordance with this invention, the emulsifier composition of this invention is usually incorporated into the dough within a range of about 0.15 to about 3.0 weight percent based upon the weight of the flour and preferably, an amount equivalent to about a 0.5 weight percent based on the weight of the flour in the dough is used.

In order to compare the results of bread prepared with the emulsifier composition of this invention with bread prepared without the emulsifier blend of this composition, a standard procedure and standard bread formula were used. The experimental bread formula which is used as a batch process is as follows:

| | Grams | Percent (flour as 100) |
|---|---|---|
| Sponge: | | |
| Flour | 865.0 | 65 |
| Water | 493.0 | a 37.2 |
| Yeast | 33.3 | 2.5 |
| Yeast food | 6.6 | 0.5 |
| Dough: | | |
| Dough flour | 465 | 35 |
| Sugar | 106.3 | 8 |
| Salt | 26.6 | 2 |
| Shortening | 40.0 | 3 |
| Non-fat dry milk solids | 80 | 6 |
| Water | 372 | a 28.2 |
| Emulsifier | 3.3–6.6 | 0.25–0.5 | a Variable based on Farinograph absorption. Use 57% H₂O in sponge and 43% H₂O in dough of total water present.

Procedure: All of the above ingredients are stored at room temperature (approximately 70° F.). The sponge ingredients are then kneaded in a 12-quart Hobart bowl, utilizing a standard dough hook, for five minutes at a low speed on the Hobart mixer. The yeast and yeast food are dissolved first in part of the sponge water and added as liquids. The sponge (dough) is fermented 4.5 hours at 86° F. and 75% relatively humidity.

The fermented sponge is then added to the Hobart mixer. The additional water, for the dough is then added and half the amount of the flour of the dough is added on top of the water and all other ingredients except the shortening are placed in the Hobart bowl. The ingredients are mixed two minutes at medium speed on the Hobart mixer. The remaining flour and the shortening are then added and the dough is mixed for approximately eight minutes on medium speed depending upon the Farinograph results and the amount of flour used. The dough is then fermented for 20 minutes at 86° F. and 75% relative humidity. After fermentation, the dough is divided into 18-oz. pieces, rounded, placed into bread pans, and allowed a 60-minute proof at 86° F. and 75% relative humidity. At this point the bread is baked for 20 minutes at 425° F. The volume of each loaf is then measured in cc. in a loaf volume meter approximately one hour after baking. The loaves are then sealed in plastic bags and stored at constant conditions (76° F., 50% relative humidity) for a period of six days. After three days and six days of storage, individual loaves of bread are sliced in half-inch slices using an Oliver Slicing Machine (No. 777). The middle five slices are used for testing on the Instron* and the end slices are discarded. Three readings are taken on each of the five slices, one in the upper corner within one-half inch of the crust, another on the center of the slice, and a third in the opposite bottom corner about ½ inch from the bottom. The slices are then observed for crumb, grain, texture, color, and other visible characteristics. In determining the Instron values, the three readings per slice are averaged and the values of the five slices are averaged to give a specific number for the softness on that particular day for that particular loaf. If more than one loaf is used, an average for the number of loaves is taken to calculate the softness for the baking at that particular day. A softness index using the softness of the control bread as 1.00 is calculated by dividing the Instron reading of the experimental sample by the reading of the control sample.

Table I gives the results of softness index for bread prepared using the emulsifier blend of the instant invention. The volume increase, a measure of conditioning, of each baking as compared to the control bread is also given.

*Instron Model TM Standard Speed. Compression Load Cell No. CB Full Scale Load 1000 grams. Compressibility distance—4 mm. (0.16 inch). Compression plunger disc—1-inch diameter. Cross head space—5 inches per minute, Chart speed—20 inches per minute.

TABLE I.—BAKING RESULTS

| Baking | Liquid emulsifier from example | Bakings | Weight percent | Loaf volume increase (cc.) | Softness index 3 days | Softness index 6 days |
|---|---|---|---|---|---|---|
| Control 1 a | None | 20 | | | 1.00 | 1.00 |
| A | 1 | 22 | 0.5 | 101 | 0.83 | 0.86 |
| B | 1 | 6 | 1.0 | 145 | 0.72 | 0.76 |
| C | 1 | 6 | 1.5 | 176 | 0.60 | 0.67 |
| Control 2 b | None | 3 | | | 1.00 | 1.00 |
| D | 2 | 3 | 0.4 | 199 | 0.81 | 0.90 |
| E | 2 | 3 | 0.8 | 255 | 0.69 | 0.73 |
| F | 2 | 3 | 1.2 | 240 | 0.69 | 0.72 |
| G | 3 | 3 | 0.4 | 212 | 0.79 | 0.83 |
| H | 3 | 3 | 0.8 | 228 | 0.74 | 0.75 |
| I | 3 | 3 | 1.2 | 238 | 0.64 | 0.74 |
| Control 3 c | None | 3 | | | 1.00 | 1.00 |
| J | 9 | 3 | 0.5 | 178 | 0.76 | 0.72 |
| Control 4 d | None | 3 | | | 1.00 | 1.00 |
| K | 9 | 6 | 0.2 | 19 | 0.99 | 0.98 |
| L | 9 | 6 | 0.4 | 135 | 0.85 | 0.87 |
| M | 9 | 6 | 0.6 | 146 | 0.78 | 0.74 |
| N | 9 | 6 | 0.8 | 176 | 0.78 | 0.74 |
| Control 5 e | None | 3 | | | 1.00 | 1.00 |
| O | 13 | 3 | 0.41 | 214 | 0.77 | 0.81 |
| P | 14 | 3 | 0.43 | 253 | 0.73 | 0.80 |
| Q | 15 | 3 | 0.44 | 236 | 0.74 | 0.81 |
| R | 16 | 3 | 0.45 | 237 | 0.76 | 0.80 |
| S | 17 | 3 | 0.47 | 251 | 0.74 | 0.79 |
| T | 18 | 3 | 0.49 | 215 | 0.76 | 0.83 | a Control 1 used for Baking A–C.
b Control 2 used for Baking D–I.
c Control 3 used for Baking J.
d Control 4 used for Baking K–N.
e Control 5 used for Baking O–T.

(1) Based on flour weight.
(2) Cc. increase over control.
(3) Control=1.00 base.

What is claimed is:

1. A temperature-stable, clear liquid composition comprising from 60–99.3 weight percent of a mixture of a fatty acid monoglyceride compound and a polyoxyethylene-containing compound selected from the group consisting of polyoxyethylenated fatty acid esters of glycerol, hexitan, hexitol, and isohexide and fatty acid esters of polyoxyethylenated hexitan, hexitol, glycerol, and isohexide wherein said mixture is from 10–80 weight percent of said monoglyceride compound, said monoglyceride compound having fatty acid moieties of 12–22 carbon atoms and at least 86 mol percent of said moieties being unsaturated fatty acid moieties, and which contains at least 40 percent by weight of said fatty acid moieties substituted in the alpha position, and said polyoxyethylene-containing compound having mols of ethylene oxide per mol of hexitan, hexitol, glycerol, and isohexide in a range between 4:1 to 40:1 wherein said fatty acid moieties have 12–22 carbon atoms, and said composition further comprising a clarifier selected from the group consisting of 3–40% by weight propylene glycol, .7–40% by weight ethanol, 5–21% by weight water, and 3–25% by weight edible oils selected from the group consisting of cottonseed, safflower, corn, soybean, coconut, peanut, and hydrogenated oils which are liquids at temperatures above 35° F.

2. An temperature-stable, clear liquid emulsifier composition according to claim 1 wherein the polyoxyethylene-containing compound is selected from the group consisting of polyoxyethylene fatty acid esters of sorbitol, sorbitan, and isosorbide, and fatty acid esters of polyoxyethylene sorbitan, sorbitol, and isosorbide.

3. A temperature-stable clear liquid emulsifier composition according to claim 1 wherein said mols of ethylene oxide per mol of hexitan, glycerol, hexitol, and isohexide in said polyoxyethylene-containing compound are from about 10:1 to 20:1, and the mol percent of unsaturated fatty acids in said monoglyceride is at least 88 mol percent of the fatty acid moieties present.

4. A temperature-stable clear liquid emulsifier composition according to claim 3 wherein the hexitan, hexitol, and isohexide of said polyoxyethylene-containing compound is selected from the group consisting of sorbitol, sorbitan, and isosorbide.

5. A temperature-stable clear liquid emulsifier composition according to claim 1 wherein the concentration of each constituent is as follows: from 10-18 percent propylene glycol, from 90-82 weight percent of a mixture of said monoglyceride and said polyoxyethylene-containing emulsifier wherein said polyoxyethylene-containing emulsifier is from 35-45 weight percent of said mixture.

6. A temperature-stable clear liquid emulsifier composition according to claim 1 wherein the concentration of each constituent is as follows: from 5-21 percent water and from 79-95 weight percent of a mixture of said monoglyceride and said polyoxyethylene-containing emulsifier wherein said polyoxyethylene-containing emulsifier is from 35-45 weight percent of said mixture.

7. A temperature-stable clear liquid emulsifier composition according to claim 6 wherein said monoglyceride is glycerol monooleate and said polyoxyethylene-containing emulsifier is polyoxyethylene(20)sorbitan monostearate.

8. A temperature-stable clear liquid emulsifier composition of claim 7 consisting of 13% water, 53.5% glycerol monooleate, and 33.5% polyoxyethylene(20)sorbitan monostearate.

9. A temperature-stable clear liquid emulsifier composition according to claim 1 wherein the concentration of each constituent is as follows: from 3-18% vegetable oil and from 82-97% of a mixture of said monoglyceride and said polyoxyethylene-containing emulsifier wherein said polyoxyethylene-containing emulsifier is from 35 to 45 weight percent of said mixture.

10. A temperature-stable clear liquid emulsifier composition according to claim 1 which contains 0.7-10 percent by weight of ethanol.

References Cited
UNITED STATES PATENTS

| | | | |
|---|---|---|---|
| 2,380,166 | 7/1945 | Griffin | 252—356 X |
| 3,085,067 | 4/1963 | Anderson | 252—153 |
| 3,269,844 | 8/1966 | Erickson | 252—356 X |

RICHARD D. LOVERING, Primary Examiner

U.S. Cl. X.R.

99—91; 252—Dig. 1, Dig. 14

UNITED STATES PATENT OFFICE
CERTIFICATE OF CORRECTION

PATENT NO. : 3,785,993
DATED : January 15, 1974
INVENTOR(S) : Roy Kenneth Langhans It is certified that error appears in the above-identified patent and that said Letters Patent are hereby corrected as shown below:

Column 2, line 21, "conditions" should read -- conditioners --.

Column 5, line 59, insert -- *Includes water incorporated with other ingredients --.

Column 7, line 27, "relatively" should read -- relative --.

Column 7, line 74, "space" should read -- speed --.

Column 8, line 31, after "liquid" and before "composition" insert -- emulsifier --.

Column 8, line 56, "An" should read -- A --.

Signed and Sealed this fourteenth Day of October 1975

[SEAL]

Attest:

RUTH C. MASON
Attesting Officer

C. MARSHALL DANN
Commissioner of Patents and Trademarks